Aug. 28, 1951 I. J. POLAND 2,566,032
ROBBERY PREVENTING SHIELD FOR TAXI VEHICLE BODIES
Filed April 18, 1950 2 Sheets-Sheet 1
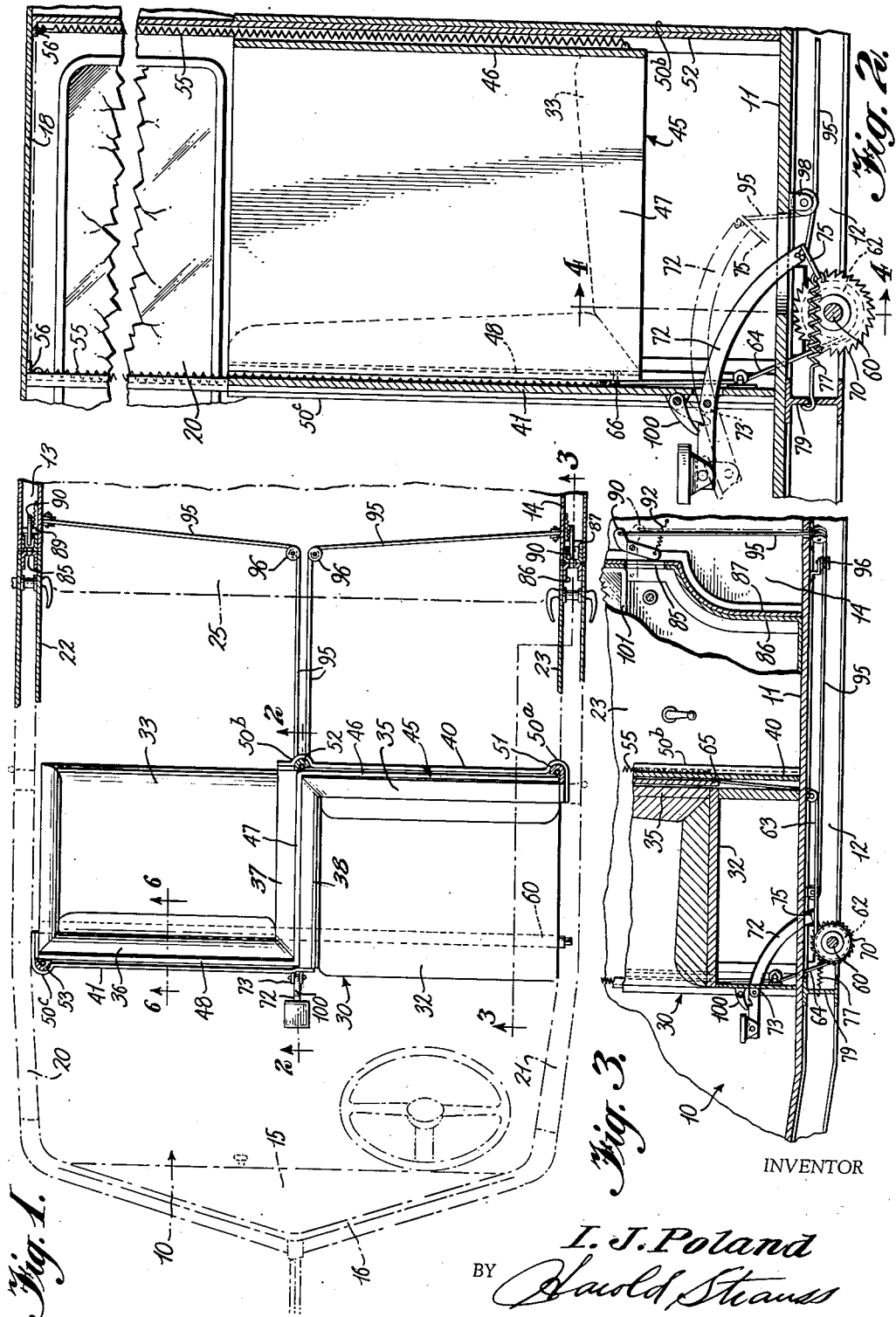
INVENTOR
I. J. Poland
BY Harold Strauss
ATTORNEY Aug. 28, 1951           I. J. POLAND           2,566,032
ROBBERY PREVENTING SHIELD FOR TAXI VEHICLE BODIES
Filed April 18, 1950           2 Sheets-Sheet 2
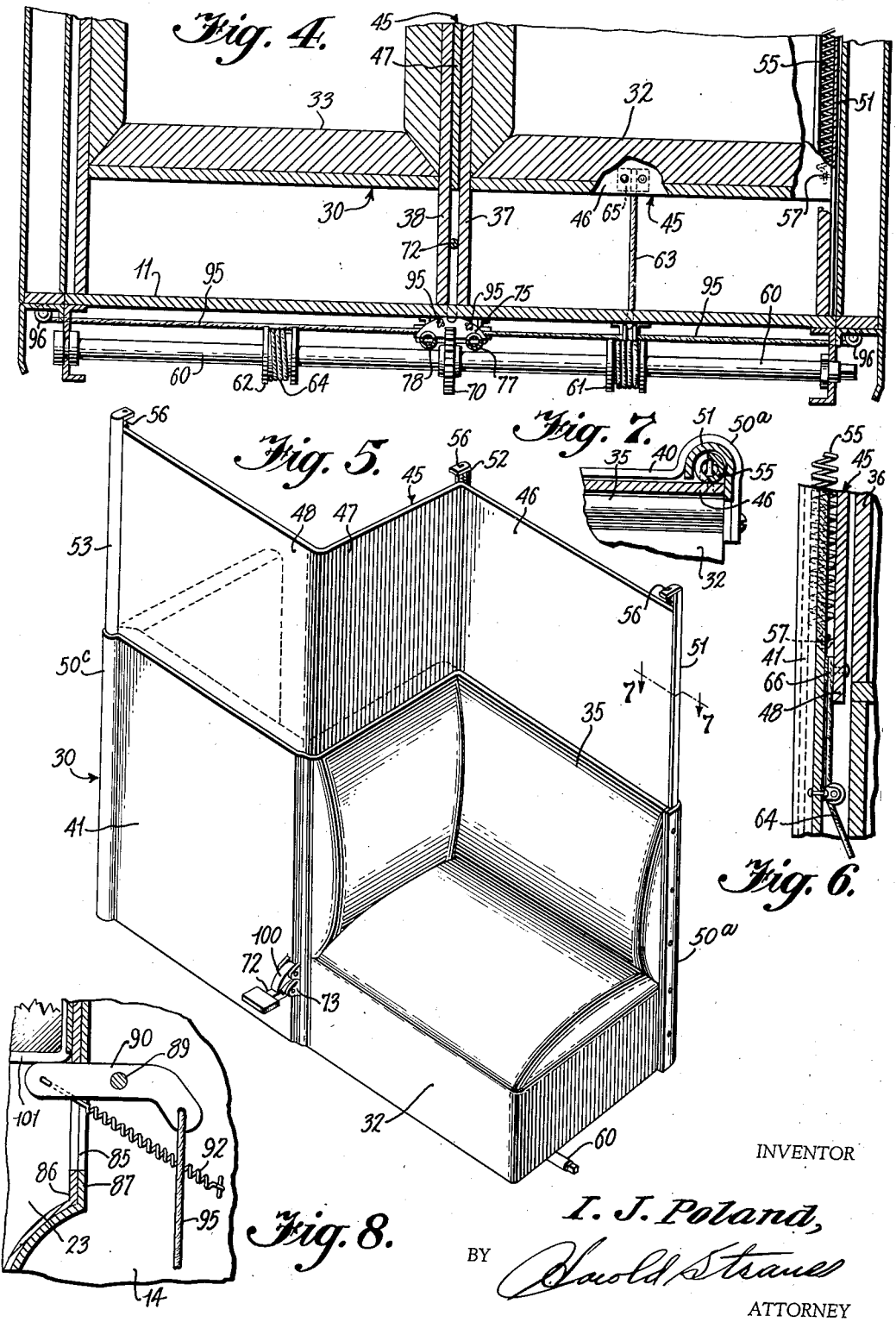
INVENTOR
I. J. Poland,
BY
Harold Strauss
ATTORNEY Patented Aug. 28, 1951

2,566,032

UNITED STATES PATENT OFFICE 2,566,032

ROBBERY PREVENTING SHIELD FOR TAXI VEHICLE BODIES

Irvin J. Poland, Baltimore, Md.

Application April 18, 1950, Serial No. 156,634

5 Claims. (Cl. 296—24)

This invention relates to vehicle bodies and more particularly to protective devices for the drivers of such vehicles.

The general object of the invention is to provide a novel and improved installation for vehicles—more especially taxicabs—for protecting the driver against hold-ups or robberies by criminals masquerading as passengers; and also for preventing the escape of such persons from the vehicle.

In its preferred embodiment the invention contemplates the provision of a shield—preferably of bullet-proof material—which may be quickly interposed between the driver's seat and the other compartments of the vehicle. The shield is normally concealed immediately behind the driver's seat and is adapted to be suddenly raised or projected toward the roof of the vehicle in an emergency.

In one embodiment of the invention the front seat of the vehicle is divided and the right-hand portion of the seat faces rearwardly and becomes a part of the passenger compartment. The shield, in such embodiments, is therefore made substantially Z-shaped in horizontal section to enclose this front passenger accommodating seat and separate it from the driver's seat.

The invention also provides means, energized at the same time that the shield is projected, to lock the rear doors of the vehicle and also to prevent the lowering of the windows, thus foiling the escape of the criminal.

Other objects and features of novelty will be apparent from the following specification, when read in connection with the accompanying drawings in which one embodiment of the invention is illustrated by way of example.

In the drawings:

Figure 1 is a fragmentary view in horizontal section of a motor vehicle embodying the principles of the invention;

Figure 2 is a partial vertical longitudinal sectional view taken on line 2—2 of Figure 1;

Figure 3 is a fragmentary vertical sectional view taken on line 3—3 of Figure 1;

Figure 4 is a fragmentary view in transverse vertical section taken on line 4—4 of Figure 2;

Figure 5 is a view in perspective of the front seating portion of the motor vehicle showing the driver's seat and the protective partition or shield in upwardly projected position;

Figure 6 is a detail section taken on line 6—6 of Figure 1;

Figure 7 is a detail view in horizontal section taken on line 7—7 of Figure 5; and Figure 8 is a fragmentary view in vertical section, being an enlargement of the upper rear portion of Figure 3.

Referring now more particularly to Figures 1 and 2 of the drawings, it will be seen that the vehicle body is designated generally by the reference numeral 10 and comprises the floor 11 supported by the body frame 12, the side walls 13 and 14, the roof 18, the instrument panel 15, the windshield 16, and steering wheel 17. The walls of the motor vehicle, which may be a taxicab in accordance with the general purpose of the invention, are provided with front doors 20 and 21, letting into the forward compartment of the cab, and rear doors 22 and 23 providing access to the rear or passenger compartment.

The rear seat of the car is indicated by broken lines at 25 in Figure 1, and the front seating installation, which is modified considerably by this invention, is given the general reference numeral 30. This installation comprises two individual seats, one the driver's seat indicated at 32, and the other a rearwardly facing passenger seat 33. The back of the driver's seat is indicated at 35, that of the forward passenger seat at 36, and a double hollow partition 37, 38 divides the two seats one from the other. These parts 35, 36, 37 and 38 are suitably upholstered on the sides facing the seats, are of a height the same as the back of an ordinary seat, and together they provide a zigzag or Z-shaped partition separating the forward or driver's compartment of the car from the rearward or passenger compartment.

To the rear side of the driver's seat-back 35 and to the forward side of the front passenger seat-back 36 are applied the spaced plates 40 and 41 which provide guide and concealment slots for portions of the zigzag or Z-shaped bullet-proof protective barrier 45. This barrier or screen comprises the panels 46, 47 and 48, the panel 46 occupying the slot between the seat back 35 and the plate 40; the other transverse panel 48 moving between the seat back 36 and the plate 41; and the intermediate panel 47 working in the slot between the partition parts 37 and 38.

At the outer edge of the driver's seat 32, within a channeled portion 50a of the plate 40 is a channel-shaped post 51 which extends up to the roof 18 of the car. At the opposite edge of the plate 40 another channeled edge 50b is formed which embraces the lower portion of a similar channel post 52. A third post 53 is embraced by a channeled edge of the plate 41 at the forwardly facing back of the seat 33.

Each of the channel posts 51, 52, and 53 encloses a strong coil tension spring 55, the upper ends of each of which are connected to the tops of the posts as at 56 and the lower ends attached to the barrier 45 as at 57, whereby the barrier or screen is strongly urged toward its upper protective position shown in Figure 5 in which the driver's compartment is entirely cut off from the passenger compartment.

For retaining the screen in retracted position as in Figure 1, the following means are provided, which are best illustrated in Figures 2, 3 and 4 of the drawings. Conveniently journalled in the sills or body frames 12, at a position adjacent the front of the driver's seat is the transverse shaft 60. Fixed upon this shaft are two reels or winding drums 61 and 62 about which are trained the cords or cables 63 and 64. The cable 63 leads about suitable guide pulleys to a point 65 where it is secured to a portion of the lower edge of the screen 45 behind the driver's seat, and the cable 64 is similarly secured to the portion 48 of the screen as at 66.

Upon an intermediate portion of the shaft 60 is fixed a ratchet wheel 70 and a foot actuated pawl lever 72 is pivoted to a fixed bracket 73 within reach of the driver. The lever may conveniently be disposed within the space between the seat partition plates 37 and 38. The rear end of the lever 72 is provided with a pawl blade 75 which is adapted to engage the teeth of the ratchet wheel 70 to prevent rotation of the shaft 60 in the screen releasing direction, i. e. the clockwise direction as viewed in Figures 2 and 3. The pawl blade 75 is purposely made rather wide and to either or both edges are secured the ends of the coil springs 77 and 78 having their other ends fastened to a cross body framing member 79. These springs effectively urge the pawl into engagement with the ratchet wheel.

From the above description, it will be readily understood how the driver, when he believes himself in danger from attack from the passenger compartment, may depress the pawl pedal 72, withdrawing the pawl 75 from engagement with the ratchet wheel 70, against the pressure of the springs 77 and 78. The shaft 60 and its drums 61 and 62, thus released, will be free to rotate in the direction to unwind the cables 63 and 64 and thus the screen controlling springs 55 will cause the screen 45 to project upwardly to the roof of the car, effectively isolating the respective driver's and passenger compartments, the one from the other.

As a further precautionary measure, the invention provides means for preventing the escape of the culprits from the passenger compartment. Referring particularly to Figures 1, 3 and 8 of the drawings, it will be seen that at the edges where the rear doors 22 and 23 close against the car walls 13 and 14 there are provided registering openings, as at 85, in the adjacent door and wall flanges 86 and 87. Pivotally mounted as at 89 on the walls 13 and 14 adjacent these openings 85 are locking elements 90. These bars or locking elements are adapted to swing through the registering openings 85 and prevent the opening of the doors. Normally the elements 90 are retracted by means of the springs 92 and are moved to door-locking positions by means of the cords 95. These cords are guided about suitable pulleys 96 to a central portion of the vehicle beneath the floor and thence to the points where they are connected to the pawl blade 75. A final pair of pulleys 98 is disposed near the path of movement of the pawl and, as readily seen in Figure 2, serves to hold the general alignment of the cords 95 when the pawl moves upwardly. A detent or latch 100, pivoted to the front seat structure engages a notch in the pawl pedal to hold it in the barrier releasing position shown in broken lines in Figure 2, wherein also the ends of the cords 95 are drawn upwardly around pulleys 98 and the door locking elements are in the operative position shown in Figure 8.

Another feature of the invention which may be effectively utilized, if desired, is suggested in Figure 3, wherein the end of the locking element 90, when in door-locking position, moves upwardly beneath the window 101 of the door structure and blocks the path of downward movement of the window.

It is understood that various changes and modifications may be made in the embodiment illustrated and described herein without departing from the scope of the invention as defined by the following claims.

What is claimed is:

1. In a vehicle of the class described, a forwardly disposed driver's seat and a rearward passenger compartment, and a protective device comprising a vertical screen vertically slidably mounted adjacent the back of the driver's seat, at least one door of the vehicle providing access to the rear compartment, an auxiliary locking device for said door, and a single actuating means accessible to the driver only for simultaneously projecting said screen upwardly to the roof of the vehicle and actuating said auxiliary locking device.

2. In a vehicle of the class described, a forwardly disposed driver's seat and a rearward passenger compartment, and a protective device comprising a vertical screen vertically slidably mounted adjacent the back of the driver's seat, at least one door of the vehicle providing access to the rear compartment, an auxiliary locking device for said door, a window in said door, said locking device having a part movable into the path of opening movement of said window when actuated, and a single actuating means accessible to the driver only for simultaneously projecting said screen upwardly to the roof of the vehicle and actuating said auxiliary locking device.

3. In a vehicle of the class described, a forwardly disposed driver's seat and a rearward passenger compartment, and a protective device comprising a vertical screen vertically slidably mounted adjacent the back of the driver's seat, springs urging said screen upwardly to the roof of the vehicle, a winding drum rotatably mounted in said vehicle, a cable having an end secured to said screen and trained about said drum to be wound in thereby to draw the screen downwardly and retract it against the urging of the spring, a ratchet rigid with said drum, and a manually actuatable pawl adapted to be brought into engagement with and released from said ratchet by the driver of the vehicle respectively to hold the screen in retracted position and to permit it to be projected.

4. In a vehicle of the class described, a forwardly disposed driver's seat and a rearward passenger compartment, and a protective device comprising a vertical screen vertically slidably mounted adjacent the back of the driver's seat, springs urging said screen upwardly to the roof of the vehicle, a winding drum rotatably mounted in said vehicle, a cable having an end secured to said screen and trained about said drum to be wound in thereby to draw the screen downwardly and retract it against the urging of the spring, a ratchet rigid with said drum, and a manually actuatable pawl adapted to be brought into engagement with and released from said ratchet by the driver of the vehicle respectively to hold the screen in retracted position and to permit it to be projected, at least one door providing access to the rear compartment, an auxiliary door locking element for said door, a spring urging said locking element toward retracted or unlocked position, a cord having one end secured to said locking element and the other to said pawl, whereby when said pawl is moved to release the screen, tension is applied to the cord to actuate the door locking element.

5. In a vehicle body of the class described, a rear seat installation and a front seat installation, said front seat installation extending entirely across the width of the vehicle, a partition dividing the body into two compartments, a driver's compartment and a passenger compartment, said partition being of zigzag configuration intersecting the front seat and providing a rearwardly disposed back for a driver's seat portion of the front seating installation and a forwardly disposed back for the other portion of the front seating installation, said last named portion facing rearwardly and providing a seat for a passenger, a concealed zigzag screen within said partition, hollow posts at the ends of said partition extending upwardly to the roof of the vehicle, coil springs in said posts, one end of each spring connected to the top of its post and the other end of each spring connected to the screen, means for retracting said screen within the partition against the urging of the springs, means for latching the retracting means, and means adjacent the driver's seat and accessible only to the driver for releasing said latching means.

IRVIN J. POLAND.

REFERENCES CITED

The following references are of record in the file of this patent:

UNITED STATES PATENTS

| Number | Name | Date |
|---|---|---|
| 1,273,429 | Wagner | July 23, 1918 |
| 1,943,581 | Butler | Jan. 16, 1934 |
| 2,378,500 | Rappl | June 19, 1945 |

FOREIGN PATENTS

| Number | Country | Date |
|---|---|---|
| 6,148 | Great Britain | Jan. 10, 1907 |